United States Patent
Citron

(10) Patent No.: US 7,243,204 B2
(45) Date of Patent: Jul. 10, 2007

(54) REDUCING BUS WIDTH BY DATA COMPACTION

(75) Inventor: Daniel Citron, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/721,316

(22) Filed: Nov. 25, 2003

(65) Prior Publication Data

US 2005/0114600 A1    May 26, 2005

(51) Int. Cl.
*G06F 12/00* (2006.01)
(52) U.S. Cl. .................... 711/171; 711/172; 711/130
(58) Field of Classification Search ............... 711/118, 711/122, 123, 3, 171, 172, 130
See application file for complete search history.

(56) References Cited

OTHER PUBLICATIONS

Citron, Daniel et al., "Creating a Wider Bus Using Caching Techniques", Proceedings of the First IEEE Symposium on High-Performance Computer Architecture, Jan. 1995, pp. 90-99.
Yang, Jun et al., "Frequent Value Compression in Data Caches", Proceedings of the 33rd International Symposium on Microarchitecture, Dec. 2000, pp. 258-275.

*Primary Examiner*—Pierre Bataille
*Assistant Examiner*—Sheng-Jen Tsai
(74) *Attorney, Agent, or Firm*—Stephen C. Kaufman

(57) ABSTRACT

An integrated circuit device includes a processing component and a cache, which is arranged to store data for use by the processing component responsively to an addressing scheme based on memory addresses having an address length of ml bits. First and second buses are coupled between the processing component and the cache, the buses having bus widths of $n_1$ and $n_2$ bits, respectively, such that $n_1 < m_1$. The processing component and the cache each include a respective address bus expander coupled to the first bus in order to compact at least some of the memory addresses for transmission over the first bus so that each of the at least some memory addresses is transmitted over the first bus in one cycle of the first bus.

24 Claims, 4 Drawing Sheets

REDUCING BUS WIDTH BY DATA COMPACTION

FIELD OF THE INVENTION

The present invention relates generally to computer systems, and specifically to buses used for data transfer in a processor chip.

BACKGROUND OF THE INVENTION

Various techniques are known in the art for increasing the effective rate at which data can be transmitted over a bus or, equivalently, for reducing the number of bus lines needed to sustain a given data bandwidth. Citron et al. describe one such method, based on data compression, in "Creating a Wider Bus Using Caching Techniques," *Proceedings of the First IEEE Symposium on High-Performance Computer Architecture* (January, 1995), pages 90–99, which is incorporated herein by reference. Rather than transmitting an entire data word over a bus, data compaction is first performed by caching the high-order bits of the word in a table, and sending an index to the table over the bus along with the low-order bits. A coherent table at the receiving end expands the word into its original form. Compaction/expansion units can be placed between a processor and memory, between a processor and a local bus, and between devices that access the system bus.

Data compression may be used in enhancing the performance of cache memories. For example, Yang et al. describe a method for storing data in compressed form so as to reduce the power consumed by a cache memory, in "Frequent Value Compression in Data Caches," *Proceedings of the 33rd International Symposium on Microarchitecture* (December, 2000), pages 258–275, which is incorporated herein by reference. The authors use a data compression scheme that is based on encoding a small number of values that appear frequently during memory accesses, while preserving the ability to randomly access individual data items.

As another example, U.S. Pat. No. 6,044,437, to Reinders, whose disclosure is incorporated herein by reference, describes a method for reducing the number of cache line data transfers among components of a computer system based on generating and transferring redundancy bits between levels of a cache memory hierarchy. Redundancy logic is provided to detect occurrences of redundant data strings in a given cache line, to generate and transfer redundancy bits when such strings occur, and to decode the redundancy bits at the destination. If redundant data strings occur in a cache line, the transfer of one or more portions of the cache line can thus be canceled. This method is said to reduce the amount of bus traffic and increase overall system performance.

SUMMARY OF THE INVENTION

Embodiments of the present invention are directed to reducing the number of bits (i.e., the number of wires) in buses that are used to convey data between components of an integrated circuit (IC). These embodiments are based on the realization that successive data words that are transferred over a bus on chip generally have low entropy. In other words, at least some of the data bits, typically the higher-order (most significant) bits, repeat from one word to the next. Therefore, it is possible to compact the data efficiently by dividing each word into two or more fields with different degrees of entropy. The most entropic field, typically comprising the least significant bits of each word, is transmitted over the bus in its entirety. The remaining field or fields are compacted into a reduced number of bits. As a result, n-bit words may be transmitted in a single cycle over an m-bit bus, wherein m<n.

In embodiments of the present invention, data compaction is performed by a first bus expander that is associated with the IC component transmitting the data over the bus. The data are then de-compacted at the receiving component by a second bus expander. The bus expanders maintain identical tables of recent data values of the field or fields that are to be compacted. In each word that is to be transmitted, the first bus expander checks the value of each of these fields against the entries in its table. When the value matches a table entry (as is expected to occur most of the time), the first bus expander transmits an index corresponding to the appropriate entry over the bus to the second bus expander. Typically, the index consists of no more than a few bits, far fewer bits than the data field that it encodes. When the value fails to match any of the table entries, two or more bus cycles are used to transmit the data word in its entirety, and the first and second bus expanders update their tables accordingly. The bus and bus expanders may be bi-directional, so that the second bus expander also compacts data for transmission to the first bus expander.

In some embodiments of the present invention, bus expanders are used to reduce the width of buses that connect processing components of a microprocessor to a cache on the microprocessor chip, such as a Level 1 (L1) cache in a hierarchical cache system. Bus expanders may also be used to reduce the width of the buses connecting the L1 cache to the Level 2 (L2) cache. The operation and timing of the bus expanders are integrated with the address lookup and other operations that are normally carried out by the cache controllers, such as loading and storing of data. As a result, the compaction and de-compaction functions of the bus expanders add little or no latency to cache access functions.

Embodiments of the present invention can thus be readily applied in IC devices to reduce the number of wires required to connect circuit components. Reduction in the number of wires simplifies the design and manufacture of the IC and lowers the risk of crosstalk between wires. It allows relatively "fat" wires, with low RC delay, to be used in buses, notwithstanding reduction in the sizes of the components that the buses interconnect due to advances in manufacturing processes. Other advantages of the present invention will be apparent to those skilled in the art.

There is therefore provided, in accordance with an embodiment of the present invention, an integrated circuit device, including:

a processing component;

a cache, which is arranged to store data for use by the processing component responsively to an addressing scheme based on memory addresses having an address length of $m_1$ bits; and first and second buses coupled between the processing component and the cache, the buses having bus widths of $n_1$ and $n_2$ bits, respectively, such that $n_1 < m_1$, the processing component and the cache each including a respective address bus expander coupled to the first bus in order to compact at least some of the memory addresses for transmission over the first bus so that each of the at least some memory addresses is transmitted over the first bus in one cycle of the first bus.

In disclosed embodiments, the data include data words having a word length of $m_2$ bits stored at each address, such that $n_2 < m_2$, and each of the processing component and the cache further includes a respective second bus expander coupled to the second bus in order to compact at least some of the data words for transmission over the second bus so that each of the at least some of the data words is transmitted over the second bus in one cycle of the second bus. Typically, the data words include data values for processing by the device, and the processing component is arranged to load the compacted data words via the second bus from the cache for processing and to store the compacted data words via the second bus to the cache. Additionally or alternatively, the data words include instructions for execution by the device, wherein the compacted words include compacted instructions, and wherein the processing component is arranged to fetch the compacted instructions via the second bus.

In some embodiments, the address bus expander and the second bus expander are arranged to compact the memory addresses and the data words simultaneously, so as to transmit a compacted memory address and a compacted data word for storage at the memory address together in one cycle of the first and second buses.

In further embodiments, the address bus expander and the second bus expander are arranged to compact the memory addresses and the data words by transmitting indices to values in respective tables held by the bus expanders, and the cache is arranged to store at least some of the indices together with the data.

In disclosed embodiments, the address bus expander is arranged to compact each of the at least some of the memory addresses by dividing each of the memory addresses into at least first and second fields, storing values of the second field in a respective table such that the values in respective tables held by the address bus expander in the processing component and the address bus expander in the cache are identical, and if the second field of a memory address matches a value in the table, transmitting an index corresponding to the value over the first bus along with the first field in the one cycle of the bus. In some embodiments, the first field includes a set of least significant bits (LSB) of the memory address, while the second field includes a set of most significant bits (MSB) of the memory address. In an alternative embodiment, the at least first and second fields include a third field, and the address bus expander is arranged to compact each of the at least some of the memory addresses by transmitting first and second indices corresponding to the values of the first and third fields, respectively, over the first bus along with the first field.

Typically, the address bus expander in the processing component is arranged, when the second field of the memory address does not match any of the values in the table, to transmit both of the first and second fields over multiple cycles of the bus, and to cause the respective table of the bus expander to be updated in both the processing component and the cache.

In one embodiment, the cache includes lines of the data that are indexed according to the first field, each line containing a corresponding value of the second field, and the address bus expander in the cache is arranged, upon receiving the index over the first bus, to retrieve the value of the second field from the table responsively to the index, and the cache is arranged to determine whether a cache hit has occurred by checking the retrieved value against the corresponding value of the second field in the line that is indexed by the first field. Typically, the address bus expander is arranged to retrieve the value of the second field from the table simultaneously with retrieval of the data from the line in the cache that is indexed by the first field for transmission of the data over the second bus to the processing component.

In a further embodiment, the cache that is coupled to the processing component by the first and second buses is a Level 1 (L1) cache, and the device further includes a Level 2 (L2) cache, and third and fourth buses coupling the L2 cache to the L1 cache, the L1 cache and the L2 cache including further bus expanders coupled to at least one of the third and fourth buses.

There is also provided, in accordance with an embodiment of the present invention, a method for coupling a processing component to a cache in an integrated circuit device, the method including:

configuring the cache to store data for use by the processing component responsively to an addressing scheme based on memory addresses having an address length of $m_1$ bits;

coupling first and second buses coupled between the processing component and the cache, the buses having bus widths of $n_1$ and $n_2$ bits, respectively, such that $n_1 < m_1$;

compacting at least some of the memory addresses for transmission over the first bus so that each of the at least some memory addresses can be transmitted over the first bus in one cycle of the first bus;

transmitting at least the compacted memory addresses over the first bus; and conveying the data over the second bus responsively to the compacted memory addresses.

The present invention will be more fully understood from the following detailed description of the embodiments thereof, taken together with the drawings in which:

DETAILED DESCRIPTION OF EMBODIMENTS

Figure 1:
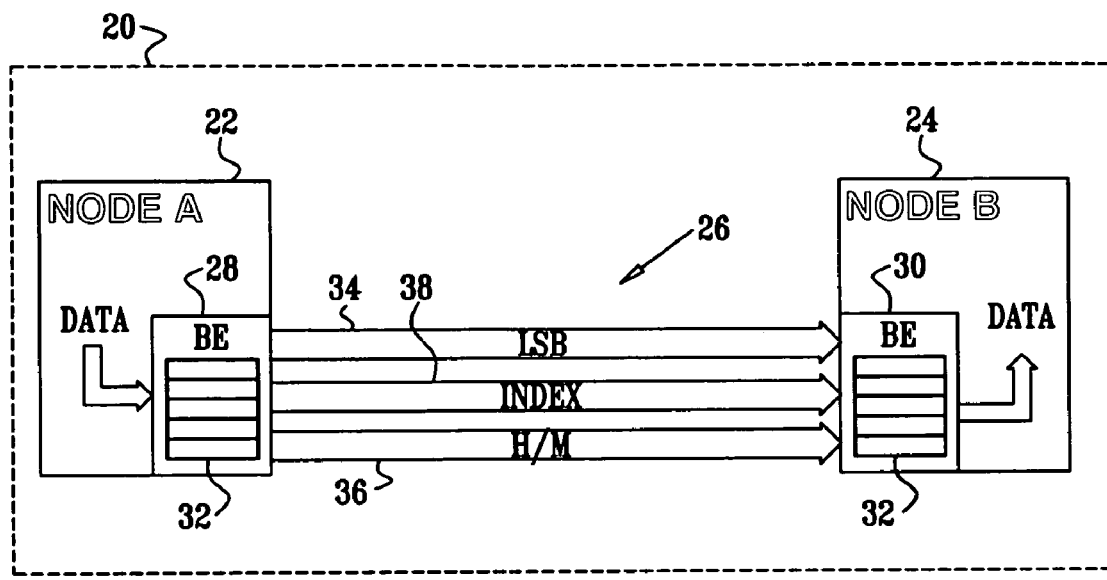
FIG. 1 is a block diagram that schematically illustrates components of an integrated circuit (IC) that are connected by reduced-width bus, in accordance with an embodiment of the present invention.

FIG. 1 is a block diagram that schematically illustrates elements of an integrated circuit (IC) 20, in accordance with an embodiment of the present invention. IC 20 is shown, in this simplified view, to comprise two components 22 and 24, labeled "NODE A" and "NODE B" for convenience. These components are connected by a bus 26 and may be taken to represent substantially any pair of IC components that are generally connected by a bus, such as a processing component, I/O component, cache or other memory. The bus may be used to convey substantially any sort of data, including addresses or instruction codes, numerical values (both integer and floating point) and data values of other types. The term "data," as used in the context of the present patent application and in the claims, should be understood to include all types of data that may be conveyed over a bus in an IC or other computing device, unless specified otherwise.

Components 22 and 24 are coupled to bus 26 via respective bus expanders (BE) 28 and 30. In the present example, BE 28 compacts words of data from component 22 for transmission over the bus, and BE 30 receives and de-compacts the words for use by component 24. It should be understood, however, that bus 26 may be bi-directional, with compacted data transmitted from bus expander 30 to bus expander 28, as well. Furthermore, the principles of the present invention are applicable to buses serving three or more components simultaneously.

BE 28 divides each data word that it is to transmit into two fields: a high-entropy field comprising the least significant bits (LSB) of the data word, and a low-entropy field comprising the most significant bits (MSB). For example, and without limitation, the data may comprise 32-bit words, which are divided into a 14-bit LSB field and an 18-bit MSB field. BE 28 looks up the MSB field of each word in a table 32 that it maintains. Each entry in the table has a corresponding index. For example, if the table contains four entries, a two-bit index is sufficient to represent it. If the MSB field matches one of the entries, BE 28 selects the corresponding index for transmission and sets a hit/miss (H/M) bit to indicate that the current word has been successfully compacted. The MSB field will generally match an entry in table 32 for a large majority of the data words as long as the choice of the number of bits to include in the MSB field is made judiciously. For each such word, BE 28 transmits the LSB field over bus 26 without compaction, on a set of LSB lines 34, and meanwhile transmits the hit/miss bit on a H/M line 36, and transmits the table index on a set of index lines 38. Thus, in the present example, when compaction is successful, each 32-bit word is transmitted over bus 26 using only 16 bits (14 LSB data plus two index lines), with the addition of a single hit/miss line.

The contents of table 32 of BE 30 are identical to those of table 32 of BE 28. Thus, upon receiving a compacted data word, and noting that the hit/miss bit on line 36 is set, BE 30 looks up the index received on index lines 38 in its own table 32. BE 30 reads out the MSB entry from the table and concatenates it with the LSB data bits on lines 34 to de-compact the data word.

When BE 28 finds that the MSB field of a given data word does not match any of the entries in table 32, it clears the hit/miss bit, and transmits the entire data word over lines 34 and 38 of bus 26 in two successive cycles. BE 30 notes the value of the hit/miss bit, and therefore does not look up the bits on lines 38 in table 32, but rather concatenates the data values transmitted during the two successive cycles in order to recover the complete 32-bit word. Both BE 28 and BE 30 replace the same entry in their respective tables 32 with the MSB of the current data word, so that the two tables remain mutually synchronized. For example, BE 28 and BE 30 may both replace the least recently used entry in their respective tables.

Figure 2:
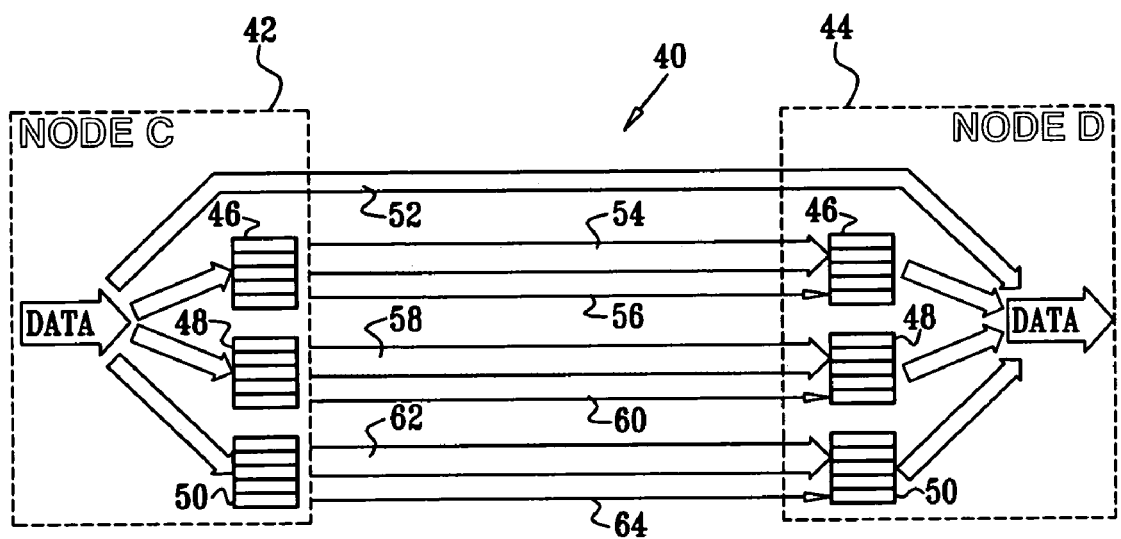
FIG. 2 is a block diagram that schematically illustrates a reduced-width bus, in accordance with another embodiment of the present invention.

FIG. 2 is a block diagram that schematically illustrates a bus 40 connecting components 42 and 44 (NODES C and D) in an IC, in accordance with another embodiment of the present invention. Components 42 and 44 comprise bus expanders, which are not shown explicitly in this figure for simplicity of illustration. In this embodiment, each data word for transmission from component 42 to component 44 is divided into four fields. For example, 64-bit data words may be divided into a first field comprising the 16 LSB of each word, a second field comprising the next 8 bits, a third field comprising the next 12 bits, and a fourth field comprising the 28 MSB. Other bit allocations, into two, three, four or more fields, will be apparent to those skilled in the art and are considered to be within the scope of the present invention.

It is assumed for the sake of example that the fields decrease successively in entropy from the LSB field to the MSB field. The LSB field is transmitted over bus 40 without compaction on a set of 16 LSB lines 52. Each of the other fields is compacted using a respective table 46, 48, 50. In this example, table 46 comprises 16 entries, and is used in compacting the second, 8-bit field to a 4-bit index. Table 48 comprises eight entries, and is used to compact the third field to a 3-bit index. Table 50 comprises only two entries, and thus compacts the fourth (MSB) field to a single-bit index. The indices that are read from tables 46, 48 and 50 are transmitted over bus 40 on respective sets of index lines 54, 58 and 62. A respective hit/miss bit for each table is transmitted over H/M lines 56, 60 and 64. The 64-bit data words are thus compacted into 24 bits for transmission over bus 40, with the addition of three hit/miss bits.

The optimal division of any given data bus into fields, as well as the number of bits to use in encoding the low-entropy fields, depends on the type of data that the bus is to transmit. The higher-order bits of successive memory addresses that are accessed by a processor tend to change very little. Therefore, when a bus is to carry 64-bit address data, for example, the upper 40 bits can be compacted with high predictability using a table with only a few entries. By contrast, instructions tend to exhibit high entropy, so that in some cases only the register fields of successive instructions are good candidates for compaction. If a bus is used exclusively for floating point data, the upper bits of the exponent portion of the data generally have low entropy and can be compacted effectively. Integer data values tend to have lower entropy in their higher-order bits than in their lower-order bits. These characteristics can be taken into account in designing appropriate buses for optimal compaction.

Figure 3:
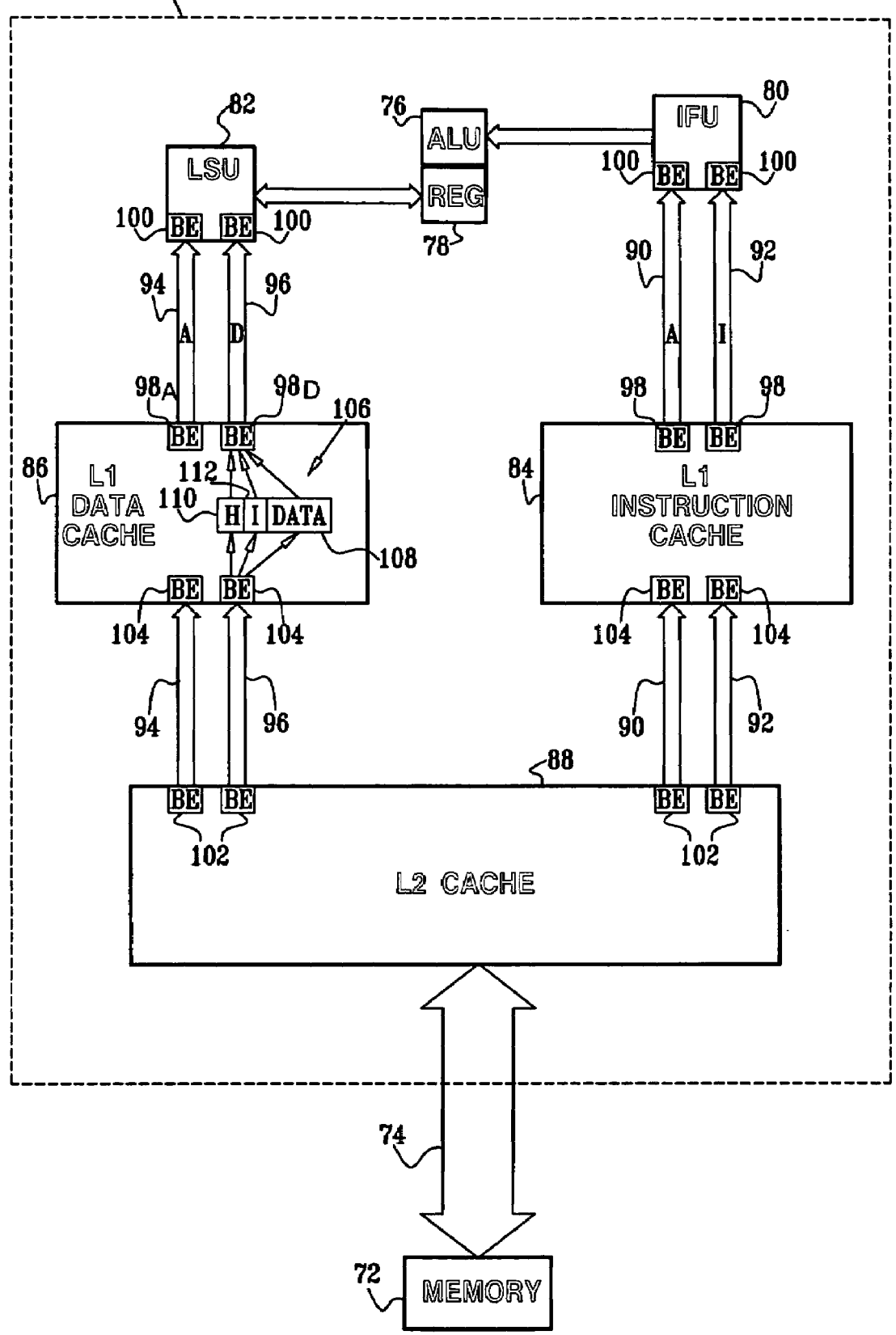
FIG. 3 is a block diagram that schematically illustrates components of a microprocessor that are connected by reduced-width buses, in accordance with an embodiment of the present invention.

FIG. 3 is a block diagram that schematically illustrates elements of a microprocessor 70, in accordance with an embodiment of the present invention. The microprocessor communicates with an off-chip memory 72 over a system bus 74. In the present, simplified example, the microprocessor comprises a computation core, such as an arithmetic logic unit (ALU) 76, with a register file 78 for holding current data values. An instruction fetch unit (IFU) 80 reads and decodes successive instructions from program code stored in memory 72, and passes the instructions for execution to ALU 76 (or to other computation elements, not shown in the figure). A load/store unit (LSU) 82 loads data required by the ALU from memory 72 into register file 78, and stores data from the register file in the memory. ALU 76, IFU 80 and LSU 82 are examples of processing components that are commonly used in microprocessors known in the art.

In order to increase the operational speed of memory access by IFU 80 and LSU 82, microprocessor 70 comprises a hierarchical cache memory arrangement. IFU 80 is served by a Level 1 (L1) instruction cache 84, while LSU 82 is served by a L1 data cache 86. The L1 caches hold copies of the instruction code and data values that are most frequently requested by the microprocessor. They typically have small capacity and are located in close proximity to the IFU and LSU in order to facilitate memory access with the lowest possible latency. The L2 cache is generally larger than the L1 caches, and holds copies of all the data (code and data values) in the L1 caches plus additional frequently-requested data. Various hierarchical cache designs are known in the art, wherein the L1 and L2 caches for instructions and data values may be unified or configured as separate units.

Although one particular configuration is shown in FIG. 3, the principles of this embodiment may be implemented in other cache configurations, as well.

IFU 80 receives addresses and instructions from L1 instruction cache 84 over an address bus 90 and an instruction bus 92, respectively. Similarly, LSU 82 receives addresses and data values from L1 data cache 86 over an address bus 94 and a data bus 96. The data (addresses, instructions and data values, as applicable) that are conveyed over these buses are compacted and de-compacted by bus expanders (BE) 98 and 100. (Bus expanders 98 connecting L1 data cache 86 to address bus 94 and data bus 96 are respectively labeled 98A and 98D, for clarity in a description given below of a process involving these bus expanders.) Comparable buses connect L2 cache 88 with L1 caches 84 and 86, and the data on these buses may likewise be compacted and de-compacted by bus expanders 102 and 104. The bus expanders in microprocessor 70 use look-up tables to encode and decode low-entropy bits on the respective buses, based on appropriate division of data words into high- and low-entropy fields, as described above.

As noted earlier, it is important in cache design to minimize cache access times, and in particular to minimize the latency of transfers between L1 caches 84 and 86 and IFU 80 and LSU 82. For this reason, the bus expanders used in microprocessor 70 are integrated with the components of the microprocessor with which they are associated, in such a way that table look-ups by the bus expanders are avoided when possible or are carried out in parallel with other cache access functions, and thus add little or no latency.

For example, referring to L1 data cache 86, bus expanders 98 and 104 that serve address bus 94 and data bus 96 may be configured to use the same respective tables for compaction of the appropriate address and data fields. The table entries of the bus expanders may be synchronized as data are passed from LSU 82 through the L1 data cache to L2 cache 88 for storage, and/or as data are loaded from the L2 cache through the L1 data cache to the LSU. Each cache line 106 in cache 86 includes, in addition to actual cached data 108, a hit/miss (H) bit 110 and an index (I) 112. In the example shown in FIG. 3, bus expander 104 has received data 108 from L2 cache 88 and has written the data to cache line 106. When bus expander 98 accesses this cache line in order to load the data to LSU 82, it checks to verify that bit 110 is set. If so, the bus expander can simply read index 112 from the cache line and can transfer the index, along with the non-compacted part of the data, over bus 96 to the LSU. The table look-up step was effectively performed in advance by bus expander 104 and need not be repeated by bus expander 98.

When one of bus expanders 98 and 104 overwrites an entry in its compaction table, it clears bit 110 in cache lines whose index 112 refers to this entry. Subsequently, when bus expander 98 accesses any of these cache lines and detects that bit 110 is cleared, the bus expander will regard index 112 of the cache line as invalid. In this case, the bus expander will perform the necessary steps in order to transmit the data (in compacted or non-compacted form) over bus 96, in the manner described above with reference to FIGS. 1 and 2.

As a further alternative, to avoid the overhead of checking and clearing bit 110, bus expander 98 transmits index 112 over bus 96 in any case, while in parallel verifying that the low-latency field in data 106 does, in fact, match the entry indicated by index 112 in the compaction table. If the entry turns out to be valid (as is expected in the large majority of cases), no further action is required, and the data transfer has taken place with no added delay for table look-up. If the data values fail to match, bus expander clears the hit/miss bit on bus 96 in the next bus cycle, and sends the correct data word at the same time.

Although the use of index 112 and hit/miss bit 110 in cache line 106 is described hereinabove with particular reference to data transfers made by bus expander 98 in L1 data cache 86, cached index values may similarly be used by the other bus expanders that are shown in caches 84, 86 and 88 in FIG. 3.

Figure 4:
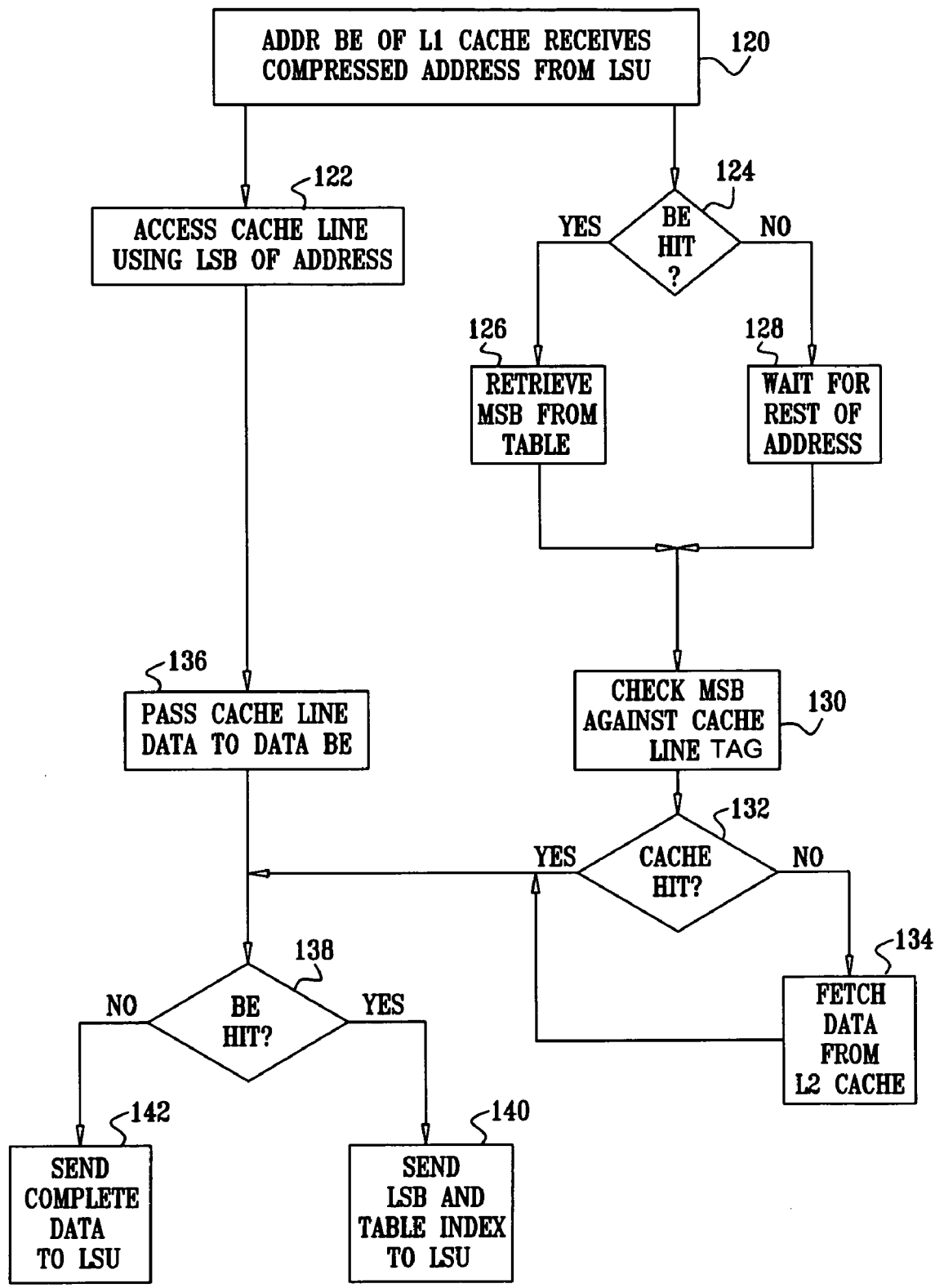
FIG. 4 is a flow chart that schematically illustrates a method for accessing data in a cache, in accordance with an embodiment of the present invention.
Figure 5:
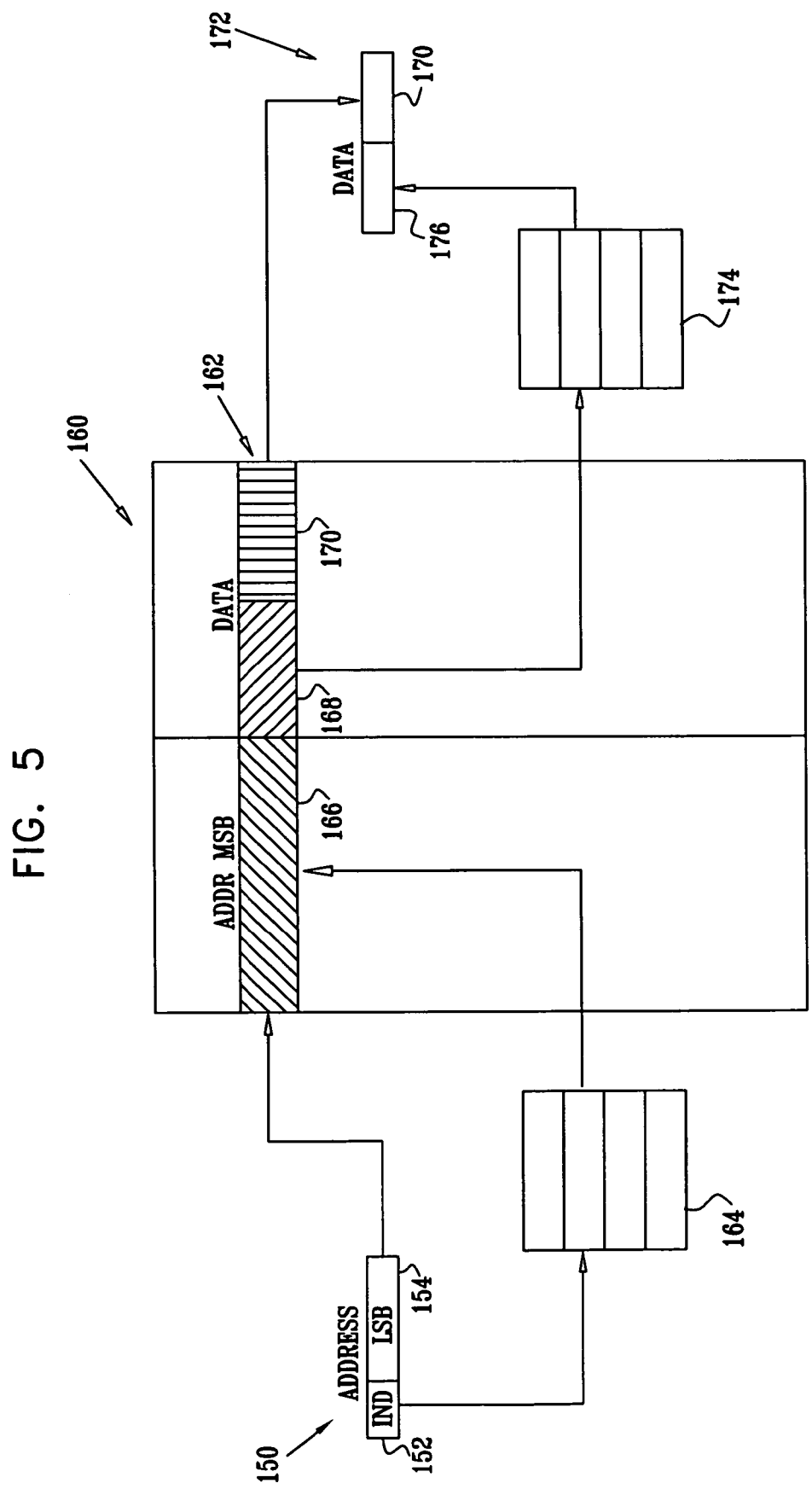
FIG. 5 is a block diagram that schematically shows data structures used in the method of FIG. 4.

Reference is now made to FIGS. 4 and 5, which schematically illustrate a method for loading data from L1 data cache 86 to LSU 82, in accordance with an embodiment of the present invention. FIG. 4 is a flow chart showing the steps in the method, while FIG. 5 shows data structures that are used for this purpose. This method may be carried out independently of the index caching technique described above in order to reduce the time required for data compaction in accessing the cache. The reduction in access time is achieved by carrying out data access and compaction steps in parallel, as is shown graphically by the figure. For the sake of explanatory clarity, the description that follows relates to bus expanders 98A and 98D and to the cache logic in cache 86 as separate functional elements. It will be understood, however, that the functions of these elements may alternatively be performed by a single cache logic unit or microcontroller. Various implementations of these elements will be apparent to those skilled in the art upon reading the present description, and are considered to be within the scope of the present invention.

The load operation begins when LSU 82 asks cache 86 to load data from a given memory address, at a load initiation step 120. At this step, BE 100 in LSU 82 generates a compacted address 150 (FIG. 5), comprising LSB 154 of the original address together with a table index 152 referring to the MSB of the address. BE 100 passes address 150 over address bus 94 to BE 98A in L1 data cache 86. BE 98A is also referred to as the address BE (ADDR BE).

Cache 86 comprises a local memory that holds a table 160 of cache lines, each corresponding to a particular address in memory 72. The lines are indexed by LSB 154 of the corresponding memory addresses. Each line contains MSB 166 of the corresponding address, which serves as an access tag, along with data, comprising MSB 168 and LSB 170, which are stored at the corresponding address. (As noted above, each cache line may also comprise hit/miss bit 110 and index 112, as shown in FIG. 3, but these additional fields are omitted from the present embodiment for the sake of simplicity.) After receiving compacted address 150 at step 120, BE 98A passes LSB 154 of the address to the cache logic, which uses the LSB to access the appropriate cache line in table 160, at a LSB access step 122. In the present example, it is assumed that cache 86 is direct-mapped, and therefore LSB 154 points to a single cache line 162. In a multi-way cache, there will be multiple cache lines with the same LSB 154.

At the same time as the cache logic accesses cache line 162, BE 98A checks the hit/miss bit on address bus 94, at an address BE hit checking step 124. If this bit is set, BE 98A uses index 152 to retrieve the MSB of the address from a compaction table 164 (like table 32 shown in FIG. 1), at a table look-up step 126. Steps 124 and 126 may take place substantially simultaneously with step 122. If the hit/miss bit is clear, however, BE 98A must wait at least one more bus cycle to receive the complete MSB of the address, at an address reception step 128.

The cache logic checks the MSB retrieved from table 164 against MSB 166 of cache line 162, at a tag checking step 130. If the MSB values match, a cache hit has occurred, meaning that the data in line 162 are valid, at a cache hit step 132. If the MSB values differ, however, the data cached in line 162 must be updated, at a cache update step 134. In this case, the cache controller (not shown) retrieves the required data from L2 cache 88 (which reads the data from memory 72 if necessary).

While the cache logic is performing steps 130 and 132, BE 98D—the data BE—reads the data in cache line 162, at a data reading step 136. BE 98D compares MSB 168 of the data to the values in its own compaction table 174, at a data BE hit checking step 138. When BE 98A signals BE 98D that a cache hit has occurred at step 132, BE 98D immediately transmits a compacted data word 172 over bus 96 to LSU 82, at a compacted data transmission step 140. Word 172 comprises LSB 170 of the data, along with an index 176 referring to the matching entry in table 174. Alternatively, in the event of a BE miss at step 138, BE 98D sends the complete data word—MSB 168 and LSB 170—over bus 96, typically over two or more bus cycles. If the cache logic signals a cache miss at step 132, BE 98D waits to complete steps 138–142 until the cache update at step 134 is completed.

When LSU 82 performs a store operation, transferring data from register file 78 to L1 data cache 86, address and data bus expanders 98A and 98D are accessed in parallel. The data bus expander retrieves the MSB of the data while the address bus expander checks the MSB of the address against the line in cache table 160 that is indicated by the LSB of the address. The compaction table indices 112 (as shown in line 106 in FIG. 3) may be stored with the cache lines for subsequent reference, as noted earlier.

Although certain embodiments are described hereinabove with reference to particular elements in microprocessor 70, the principles of the present invention, as exemplified by these embodiments, may be applied to buses connecting other components of the microprocessor, as well as to internal buses in integrated circuits of other types. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An integrated circuit chip, comprising:
a processing component on the integrated circuit chip;
a Level 1 (L1) cache and a Level 2 (L2) cache on the chip, which are arranged to store data for use by the processing component responsively to an addressing scheme based on memory addresses having a predetermined address length; and
first and second buses on the chip coupled between the processing component and the L1 cache, and third and fourth buses on the chip coupled between the L1 cache and the L2 cache, the first and third buses having bus widths smaller than $m_1$,
the processing component and the L1 and L2 caches comprising respective address bus expanders coupled to the first and third buses in order to compact at least some of the memory addresses for transmission over the first and third buses so that each of the at least some memory addresses is transmitted over the first and third buses in one bus cycle,
wherein the L1 cache comprises a table for use in compaction of address fields that is shared by the address bus expanders coupled to the first and third buses.

2. The chip according to claim 1, wherein the data comprise data words having a predetermined word length stored at each address, such that the second bus has a bus width smaller than the predetermined word length, and
wherein each of the processing component and the cache further comprises a respective second bus expander coupled to the second bus in order to compact at least some of the data words for transmission over the second bus so that each of the at least some of the data words is transmitted over the second bus in one cycle of the second bus.

3. The chip according to claim 2, wherein the data words comprise data values for processing by the processing component, and wherein the processing components arranged to load the compacted data words via the second bus from the cache for processing and to store the compacted data words via the second bus to the cache.

4. The chip according to claim 2, wherein the data words comprise instructions for execution by the processing component, wherein the compacted words comprise compacted instructions, and wherein the processing component is arranged to fetch the compacted instructions via the second bus.

5. The chip according to claim 2, wherein the address bus expander and the second bus expander are arranged to compact the memory addresses and the data words simultaneously, so as to transmit a compacted memory address and a compacted data word for storage at the memory address together in one cycle of the first and second buses.

6. The chip according to claim 2, wherein the address bus expander and the second bus expander are arranged to compact the memory addresses and the data words by transmitting indices to values in respective tables held by the bus expanders, and wherein the cache is arranged to store at least some of the indices together with the data.

7. The chip according to claim 1, wherein the address bus expander is arranged to compact each of the at least some of the memory addresses by dividing each of the memory addresses into at least first and second fields, storing values of the second field in a respective table such that the values in respective tables held by the address bus expander in the processing component and the address bus expander in the cache are identical, and if the second field of a memory address matches a value in the table, transmitting an index corresponding to the value over the first bus along with the first field in the one cycle of the bus.

8. The chip according to claim 7, wherein the first field comprises a set of least significant bits (LSB) of the memory address, while the second field comprises a set of most significant bits (MSB) of the memory address.

9. The chip according to claim 7, wherein the at least first and second fields comprise a third field, and wherein the address bus expander is arranged to compact each of the at least some of the memory addresses by transmitting first and second indices corresponding to the values of the first and third fields, respectively, over the first bus along with the first field.

10. The chip according to claim 7, wherein the address bus expander in the processing component is arranged, when the second field of the memory address does not match any of the values in the table, to transmit both of the first and second fields over multiple cycles of the bus, and to cause the respective table of the bus expander to be updated in both the processing component and the cache.

11. The chip according to claim 7, wherein the cache comprises lines of the data that are indexed according to the first field, each line containing a corresponding value of the second field, and
wherein the address bus expander in the cache is arranged, upon receiving the index over the first bus, to retrieve the value of the second field from the table responsively to the index, and
wherein the cache is arranged to determine whether a cache hit has occurred by checking the retrieved value against the corresponding value of the second field in the line that is indexed by the first field.

12. The chip according to claim 11, wherein the address bus expander is arranged to retrieve the value of the second field from the table simultaneously with retrieval of the data from the line in the cache that is indexed by the first field for transmission of the data over the second bus to the processing component.

13. A method for coupling a processing component on an integrated circuit chip to a Level 1 cache and a Level 2 cache on the integrated circuit chip, the method comprising:
configuring the Level 1 and Level 2 caches to store data for use by the processing component responsively to an addressing scheme based on memory addresses having a predetermined address length;
coupling first and second buses on the chip between the processing component and the L1 cache, and third and fourth buses on the chip coupled between the L1 cache and the L2 cache, the first and third buses having bus widths smaller than the predetermined address length;
compacting at least some of the memory addresses for transmission over the first and third buses using a table in the L1 cache that is shared by address bus expanders coupled to the first and third buses, so that each of the at least some memory addresses can be transmitted over the first and third buses in one bus cycle;
transmitting at least the compacted memory addresses over the first and third buses; and
conveying the data over the second and fourth buses responsively to the compacted memory addresses.

14. The method according to claim 13, wherein the data comprise data words having a predetermined word length e stored at each address, such that the second bus has a bus width smaller than the predetermined word length, and
wherein conveying the data comprises compacting at least some of the data words for transmission over the second bus so that each of the at least some of the data words is transmitted over the second bus in one cycle of the second bus.

15. The method according to claim 14, wherein the data words comprise data values for processing by the integrated circuit chip, and wherein conveying the data comprises loading the compacted data words via the second bus from the cache for processing by the processing component, and storing the compacted data words from the processing component via the second bus to the cache.

16. The method according to claim 14, wherein the data words comprise instructions for execution by the chip, wherein the compacted words comprise compacted instructions, and wherein conveying the data comprises fetching the compacted instructions from the cache via the second bus to the processing component.

17. The method according to claim 14, wherein compacting the at least some of the memory addresses and compacting at least some of the data words comprise compacting at least a portion of the memory addresses and the data words simultaneously, so as to transmit a compacted memory address and a compacted data word for storage at the memory address together in one cycle of the first and second buses.

18. The method according to claim 14, wherein compacting the at least some of the memory addresses and compacting at least some of the data words comprise compacting the memory addresses and the data words by transmitting indices to values in respective tables held in the cache and the processing component, and storing at least some of the indices in the cache together with the data.

19. The method according to claim 13, wherein compacting the at least some of the memory addresses comprises:
dividing each of the at least some of the memory addresses into at least first and second fields; and
storing values of the second field in a respective table such that the values in respective tables held in the processing component and in the cache are identical, and
wherein transmitting at least the compacted memory addresses comprises, if the second field of a memory address matches a value in the table, transmitting an index corresponding to the value over the first bus along with the first field in the one cycle of the bus.

20. The method according to claim 19, wherein the first field comprises a set of least significant bits (LSB) of the memory address, while the second field comprises a set of most significant bits (MSB) of the memory address.

21. The method according to claim 19, wherein the at least first and second fields comprise a third field, and wherein transmitting the index comprises transmitting first and second indices corresponding to the values of the first and third fields, respectively, over the first bus along with the first field.

22. The method according to claim 19, wherein transmitting at least the compacted memory addresses comprises, when the second field of the memory address does not match any of the values in the table, transmitting both of the first and second fields over multiple cycles of the bus, and updating the respective table in both the processing component and the cache.

23. The method according to claim 19, wherein configuring the cache comprises indexing lines of the data according to the first field, each line containing a corresponding value of the second field, and wherein conveying the data comprises:
receiving the index in one of the compacted memory addresses over the first bus; and
determining whether a cache hit has occurred by retrieving the value of the second field from the table responsively to the index, and checking the retrieved value against the corresponding value of the second field in the line that is indexed by the first field.

24. The method according to claim 23, wherein determining whether the cache hit has occurred comprises simultaneously retrieving the value of the second field from the table and retrieving the data from the line that is indexed by the first field for transmission over the second bus to the processing component.

* * * * *